(12) United States Patent
Ngiam et al.

(10) Patent No.: US 9,792,826 B2
(45) Date of Patent: Oct. 17, 2017

(54) GROUP FORMATION AND NOTIFICATION IN AN ON-LINE COURSE SYSTEM

(71) Applicant: Coursera, Inc., Mountain View, CA (US)

(72) Inventors: Jiquan Ngiam, Mountain View, CA (US); Alex Sarlin, San Francisco, CA (US)

(73) Assignee: Coursera, Inc., Mountain View, CA (US)

( * ) Notice: Subject to any disclaimer, the term of this patent is extended or adjusted under 35 U.S.C. 154(b) by 213 days.

(21) Appl. No.: 14/254,386

(22) Filed: Apr. 16, 2014

(65) Prior Publication Data
US 2014/0315178 A1    Oct. 23, 2014

Related U.S. Application Data

(60) Provisional application No. 61/813,132, filed on Apr. 17, 2013.

(51) Int. Cl.
*G09B 7/00*        (2006.01)
*G09B 7/073*       (2006.01)

(52) U.S. Cl.
CPC .............. *G09B 7/00* (2013.01); *G09B 7/073* (2013.01)

(58) Field of Classification Search
CPC ... G09B 5/00; G09B 7/00; G09B 7/07; G09B 7/073
See application file for complete search history.

(56) References Cited

U.S. PATENT DOCUMENTS

| 6,160,987 A * | 12/2000 | Ho | G09B 5/065 |
| | | | 273/432 |
| 2002/0132217 A1* | 9/2002 | Yonezu | G09B 5/02 |
| | | | 434/362 |
| 2008/0268418 A1* | 10/2008 | Tashner | G09B 7/00 |
| | | | 434/365 |
| 2009/0068631 A1* | 3/2009 | Halliwell | G09B 19/18 |
| | | | 434/362 |
| 2011/0117534 A1* | 5/2011 | Berger | G09B 7/02 |
| | | | 434/350 |

(Continued)

*Primary Examiner* — Peter Egloff
(74) *Attorney, Agent, or Firm* — Brake Hughes Bellermann LLP

(57) ABSTRACT

An on-line course system involves an On-Line Course Content Serving Web Server (OCCSWS). The OCCSWS serves, or otherwise enables the providing of, on-line course materials such as textual materials and/or a video to a large number of remotely located students. The students view the course materials and take part in the classes remotely via the internet. The OCCSWS performs volunteered user data collection, thereby obtaining for each student items of first classification information. The OCCSWS performs behavioral user data collection, thereby obtaining for each student items of second classification information. The items of first and second classification information are used to group the students into groups. The OCCSWS then communicates, to each student, an indication of the group to which the student has been assigned. The OCCSWS facilitates the students engaging in group activities, monitors the students, and if necessary prompts the students to perform certain group activity tasks.

21 Claims, 7 Drawing Sheets

ON-LINE COURSE CONTENT
SERVING SYSTEM

(56) References Cited

U.S. PATENT DOCUMENTS

2013/0204942 A1* 8/2013 Agarwal .............. H04L 65/403
709/204
2014/0065591 A1* 3/2014 Tulgan .................... G09B 5/08
434/350

* cited by examiner

ON-LINE COURSE CONTENT
SERVING SYSTEM

USER PROFILE WEB PAGE

DASH BOARD WEB PAGE

RENDERED WEB PAGE

GROUP WEB PAGE

GROUP WEB PAGE

GROUP FORMATION AND NOTIFICATION IN AN ON-LINE COURSE SYSTEM

GROUP FORMATION AND NOTIFICATION IN AN ON-LINE COURSE SYSTEM

CROSS-REFERENCE TO RELATED APPLICATION

This application claims the benefit under 35 U.S.C. §119 from provisional U.S. patent application Ser. No. 61/813,132, entitled "Social Learning," filed on Apr. 17, 2013. This application expressly incorporates by reference the entire content of provisional U.S. patent application Ser. No. 61/813,132.

TECHNICAL FIELD

The described embodiments relate generally to on-line course content serving systems, to components of such systems, and to related methods.

BACKGROUND INFORMATION

How students learn is complex and involves many different factors. There are generally environmental factors. There are also clearly factors specific to the individual. Traditional classroom learning often has a desirable social component that contributes to learning, may foster healthy competition among students, may motivate students for a variety of personal reasons, and may improve the communication of concepts being taught. Whether the social component is desirable or undesirable is also dependent on certain factors. In contrast to traditional classroom environments, an on-line learning environment may be very different in that it may often involve a great many students. These students may be spread over a wide geographical area. It may be difficult or impossible for an instructor to give personal assistance to so many students. A single on-line class may, for example, involve one hundred thousand students and may have students located on several different continents in many different time zones. The students may have many different backgrounds and may have different abilities. Apparatuses and methods for providing on-line courses to many such students in such on-line environments are sought.

SUMMARY

An On-line Course Content Serving Web Server (OC-CSWS) and related systems and methods are disclosed. The OCCSWS provides on-line video courses to a great number of students, where the students are located remotely and partake in the on-line courses remotely across the internet, each using his/her own personal content viewing network device. Textual course materials and/or an instructional video can be provided to the students directly from the OCCSWS. Alternatively, textual course materials and/or an instructional video may be stored on another server, and the OCCSWS may enable the students' accessing of the course materials and video from the other server. Accordingly, the OCCSWS enables each student taking the course to receive both the textual course materials as well as the instructional video for the course.

In such a system, the OCCSWS performs "volunteered user data collection" so that the OCCSWS obtains, for each student partaking in the course, first classification information specific to the student. The term "volunteered" as it is used here means that the student provides the information knowingly in response to some kind of query from the OCCSWS. In one example, the first classification information includes numerous items of information received by the OCCSWS as a result of the student receiving a user profile web page, being queried by queries on the web page, and then in response entering the information asked for by the user profile web page. In this example, the user profile web page queries the student for the student's name, address, gender, age range, highest educational level, schools previously attended, current employer, past employers, and other personal information. The user profile web page also queries the student for the student's academic interests, for the student's skills, and for the student's self-identified personality characteristics. The student may, or may not, enter information in response to a particular query. The items of collected volunteered information are referred to as items of the first classification information.

In addition to volunteered user data collection, the OCCSWS performs behavioral user data collection so that the OCCSWS obtains, for each student, an amount of second classification information specific to the student. The term "behavioral" as it is used here means that the student does not knowingly enter the second classification in response to a query from the OCCSWS specifically requesting that information. For example, the IP address of the student may be obtained without the student knowingly entering that specific information in response to a query on an OCCSWS served web page. For example, the student's current geographical location may be determined or guessed at by collecting other information about the student and how the student acted while on line. For example, the OCCSWS can obtain information about the student's study habits by monitoring when the student was on-line using on-line course materials, and/or by monitoring the intensity of activity of the student, and/or by monitoring the duration of on-line study, and/or by monitoring other student behaviors. The OCCSWS can monitor the degree to which the student voluntarily interacts with other students, and joins groups. The OCCSWS can detect the language used by the student by monitoring the language the student elects to use in viewing course materials or listening to videos. For example, the student's email address can be used to obtain certain information about the student. The student's past success in taking on-line courses can be logged and tracked. For example, the OCCSWS may embed analytics code into web pages that are served to the student, such that the student's web browser is then made to send reporting information about the student back to an analytics server. The OCCSWS may act as such an analytics server, or the analytics server may be another server that in turn communicates items of the second classification information back to the OCCSWS.

Based on the collected items of first classification information and on the collected items of second classification information, the OCCSWS groups students by assigning each student to at least one group of students. For each student, the OCCSWS communicates an indication of the assigned group to the student. In one example, the indication of the group to which the student is assigned is communicated from the OCCSWS to the student across the internet by including an indication of the assigned group in a section of a dash board web page that the OCCSWS serves to the student. If the student is assigned to a group, then an indication of the group appears in this section of the dash board page. If the student is assigned a group but the student must then voluntarily and affirmatively act to join the group to become a member of the group, then the assigned group is indicated in another section of the dash board web page.

A student assigned to a group in this way may then be prompted through a web page served by the OCCSWS to perform various tasks to help ensure that the students in a group in fact begin to interact as a group. For example, a student may be prompted to upload a group photo of the group. Another student may be prompted to set up an initial meeting for the group. Tools are provided in the served web pages to assist the students in setting up a meeting, such as a live chat meeting, an in-person meeting or a private forum. A virtual whiteboard facility is also provided whereby students of the group can all see the same virtual whiteboard, can all write on the same virtual whiteboard, and can all erase parts of the whiteboard if they wish. After prompting students to engage in group activity in this way, the OCCSWS monitors actions of the students in the group, and if the prompted student is determined by the OCCSWS not to have performed the requested task, then the OCCSWS may automatically prompt the student again at a certain time and/or the OCCSWS may automatically prompt another student to perform the requested task. By forming groups of students having symbiotic and compatible personal characteristics, and prompting and promoting particular students to work in particular groups, overall student learning is promoted despite the large number of widely separated students who are taking the on-line course and despite the fact that the instructor may not be able to provide as much student feedback as would otherwise be desirable. The students, through group interaction, provide each other feedback and answer each other's questions and generally promote each other's learning.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
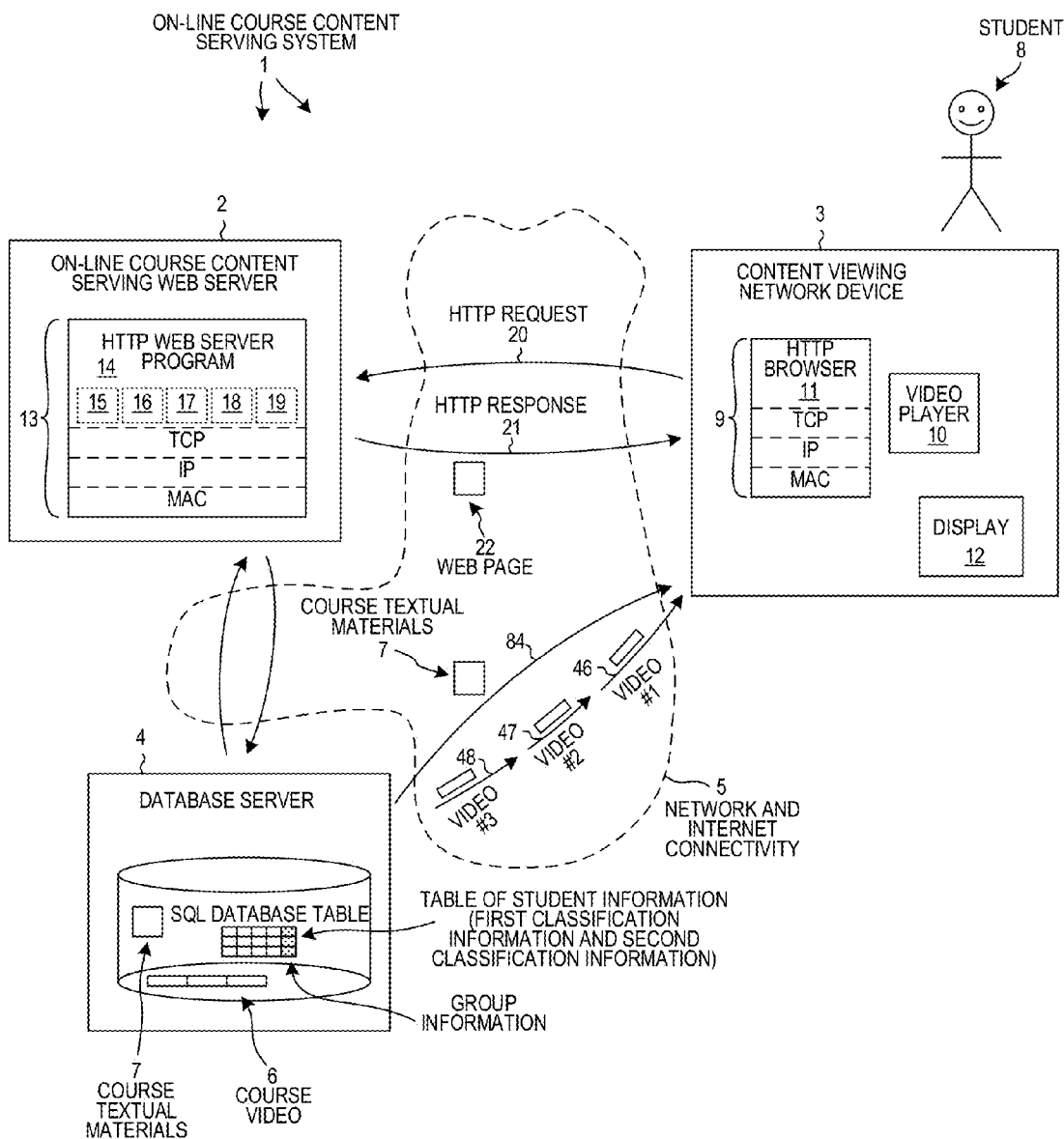
FIG. 1 is a diagram of a system involving an On-Line Course Content Serving Web Server (OCCSWS).

FIG. 1 is a diagram of an on-line course content serving system 1. System 1 includes an On-line Course Content Serving Web Server (OCCSWS) 2, a content viewing network device 3, a database server 4, and network and internet connectivity 5. The system 1 is operated and maintained by an on-line course company. The system 1 allows students around the world to enroll in and to partake in on-line courses through the internet. The system 1 serves many different on-line courses that are provided by many different instructors and course content providers. In one example, an instructor of a course engages the on-line course company to serve the instructor's course materials to students via the internet. The instructor then provides an instructional course video 6 and associated textual materials 7 for the on-line course, and these materials are stored in the OCCSWS 2 and/or in the database server 4. In the example illustrated, both the instructional course video 6 and the textual materials 7 are stored on database server 4, and the students retrieve these materials directly from the database server 4. Although in some embodiments the on-line course company owns and operates both the OCCSWS 2 and the database server 4, in the presently described embodiment the OCCSWS 2 is owned and operated by the on-line course company whereas the database server is owned and operated by another company that has been engaged by the on-line course company to store and serve the course materials on behalf of the on-line course company.

In the example of FIG. 1, there are thousands of students who are enrolled and remotely taking part in courses using the system, and there are at least hundreds of on-line courses being provided to these students. Student 8 is a representative one of these students. Student 8 uses the student's content viewing network device 3 to access an on-line course web site served by the OCCSWS 2. Network device 3 is a network connected computer capable of viewing streaming video and engaging in on-line live chat sessions. Network device 3 in this case is a personal computer that has supporting hardware including a CPU, memory, network interface circuitry and other peripherals, a keyboard, a display 12, speakers, a microphone, and a camera. Software including an operating system, a network stack 9 and a video player 10 is executing on the hardware of the network device. The application layer of the stack includes an HTTP browser 11 usable to engage in HTTP communications and to render web pages. The student 6 uses the network device 3 to access the on-line course web site, to enroll in on-line courses, and then for each on-line course to take part in the course by receiving the course's textual materials and the instructional video.

The OCCSWS 2 is a computer capable of serving the on-line course web site and providing, or enabling the providing of, on-line course materials to students via the internet connectivity 5. Although the OCCSWS is illustrated here as a single server, the OCCSWS may involve several servers that are operating the same software and that communicate with one another. The computer of the OCCSWS 2 has supporting hardware including a CPU, memory, network interface circuitry. Software including a network stack 13 is executing on the hardware of the computer. An on-line course HTTP web server program 14 is one of the application layer programs executing on the hardware. The on-line course HTTP web server program 14 includes a volunteered user data collection module 15, a behavioral user data collection module 16, a group formation module 17, a dash board module 18, and a group web page module 19.

In one operational example, the student 8 uses the student's content viewing network device 3 to access the on-line course web site being served by the OCCSWS 2. In response to an HTTP request 20, the OCCSWS 2 returns an HTML response 21. The response is an HTML document that is then rendered by the browser 11 on the display 12 student's device 3. The HTML document is a web page 22 of the on-line course web site. The HTTP communication is standard HTTP communications between the student's browser 11 and the web server program 14, with the communications passing up and down through the respective stacks 9 and 13 and across the internet 5

Figure 2:
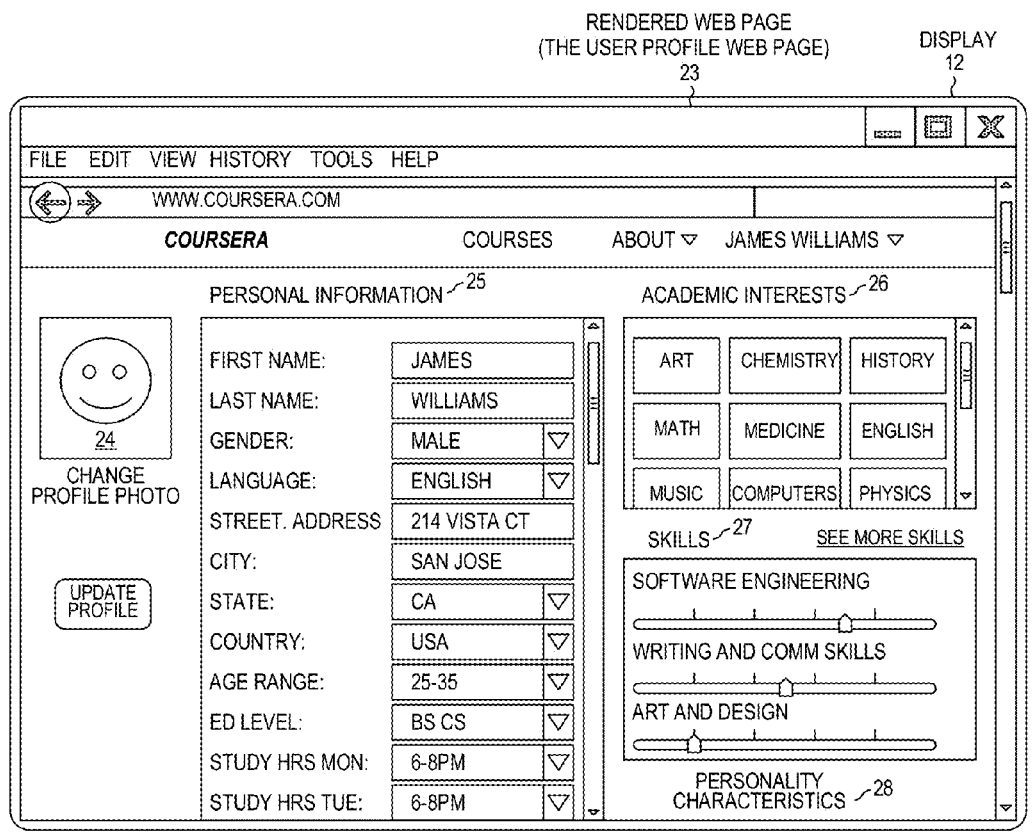
FIG. 2 is a diagram of a user profile web page served by the OCCSWS of the system of FIG. 1.

FIG. 2 is a diagram of the user profile web page 23. In the enrolling process, one of the web pages retrieved by the student 8 in this way is the user profile web page 23. As explained in further detail below, the student enters various information that is then communicated back to the web server program 14. This information includes a photo 24 of the student, personal information 25, academic interests information 26, skills information 27 and personal characteristics information 28. After opening an account and submitting the requested information via the profile web page 23, the student can then enroll in on-line courses.

Figure 3:
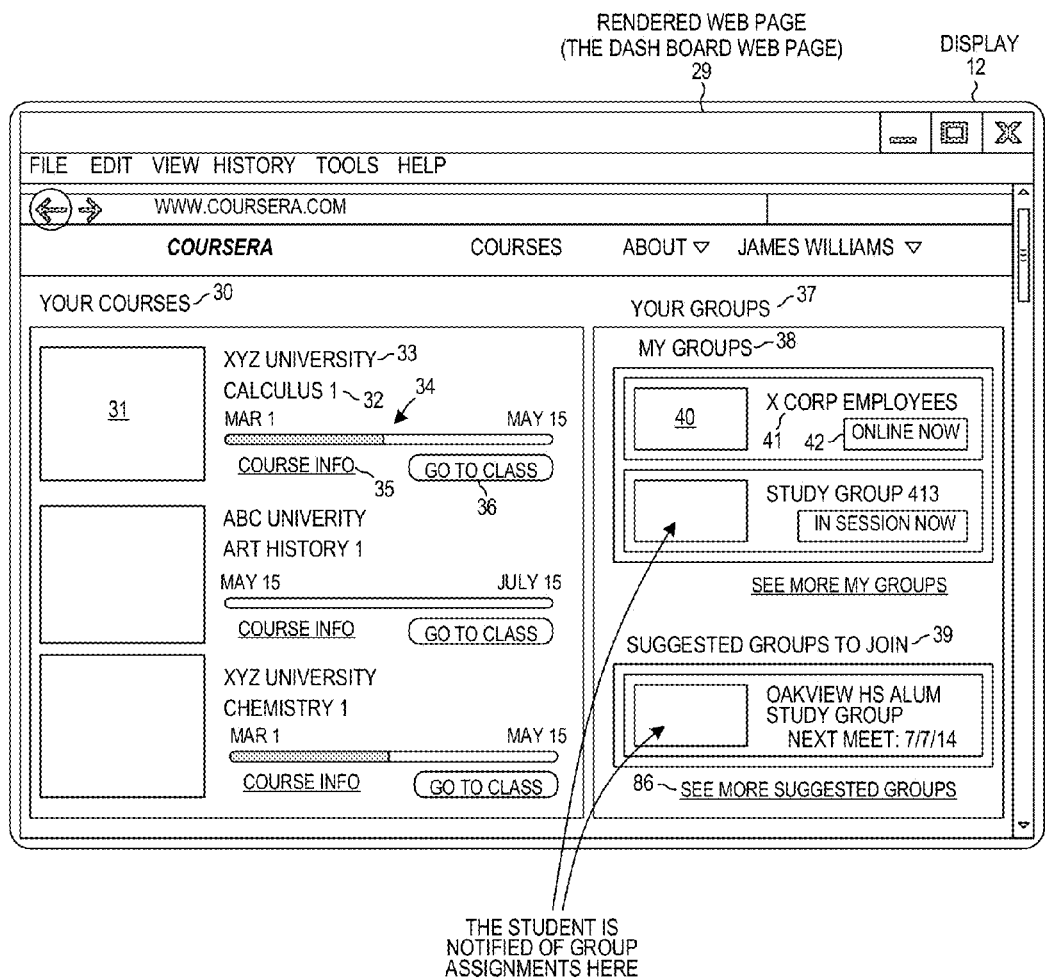
FIG. 3 is a diagram of a dash board web page served by the OCCSWS of the system of FIG. 1. In accordance with one novel aspect, the dash board web page includes an indication of a group or groups to which the OCCSWS has assigned the student.

FIG. 3 is a diagram of the dash board web page 29 for the student's account. The student in this case is named "James Williams". The courses the student is enrolled in are indicated in the YOUR COURSES section 30 of the screen. For the CALCULUS 1 course, a photo or graphic 31 that is somehow indicative of the course is shown, the course name 32 is shown, the course provider 33 is indicated, a time bar 34 showing the duration of the course is shown, a link 35 to other information such as the course textual materials is provided, and an icon 36 is provided that if selected allows the student to then view the instructional video for the course. This information is provided for each course. In the illustrated example, the student, James Williams, is enrolled in three courses. Two of the courses have started and are in process, whereas the third ART HISTORY 1 course has not yet begun.

In one novel aspect, the dash board web page 29 also includes group information in the YOUR GROUPS section 37 of the screen. As explained in further detail below, the students in a course are grouped into groups. The OCCSWS 2 initially sets up groups, and assigns each student in the class to at least one group. In addition, students can form their own groups using the OCCSWS system and through the OCCSWS system can invite others to join the new group. In addition, the OCCSWS 2 may suggest a "suggested group" to a student that the student can then join if the student is so inclined. In the illustrated example, the groups that the student James Williams has joined are set forth in the MY GROUPS section 38 of the screen, whereas the groups being suggested to the student as set forth in the SUGGESTED GROUPS TO JOIN section 39 of the screen. For the X CORP EMPLOYEES group, a photo or graphic 40 that is somehow indicative of the group is shown, the group name 41 is shown, and information about the next meeting of the group is provided. In the case of the X CORP EMPLOYEES meeting, the group is currently having an on-line live chat meeting, so an icon 42 titled ONLINE NOW is provided as the form of information about the next meeting. If the student clicks on the ONLINE NOW icon 42, then the student will be directed to the on-line live chat session that is in process. If the group is not currently meeting, then the information on the next future scheduled meeting of the group is presented. In the illustrated example, the student, James Williams, is a member of two groups, and the OCCSWS is suggesting that the student join a third group.

The fact that a student may be assigned to a group by the OCCSWS does not mean that the student must stay in that group, or cannot change groups, or cannot join another group. The SEE MORE SUGGESTED GROUPS link 86 in section 39, if clicked, returns to the student an ordered list of all existing groups of students. The first group in the ordered list is the group that the OCCSWS has determined is most suitable for the student, the second group in the ordered list is the next most suitable group for the student as determined by the OCCSWS, and so forth. If the student wishes to join a particular group, the group will appear somewhere in this list, and the student can find the desired group and click on its link. The clicking on the link will cause the group to appear in the SUGGESTED GROUPS TO JOIN section 39. The student can then click on the icon for suggested group, and in so doing can join the group.

If the student wishes to listen to the instructional video of course or otherwise progress further in the course, the student can click on one of the courses in the YOUR COURSES section 30 of the dash board web page 29 of FIG. 3. This will cause a course web page to be displayed.

Figure 4:
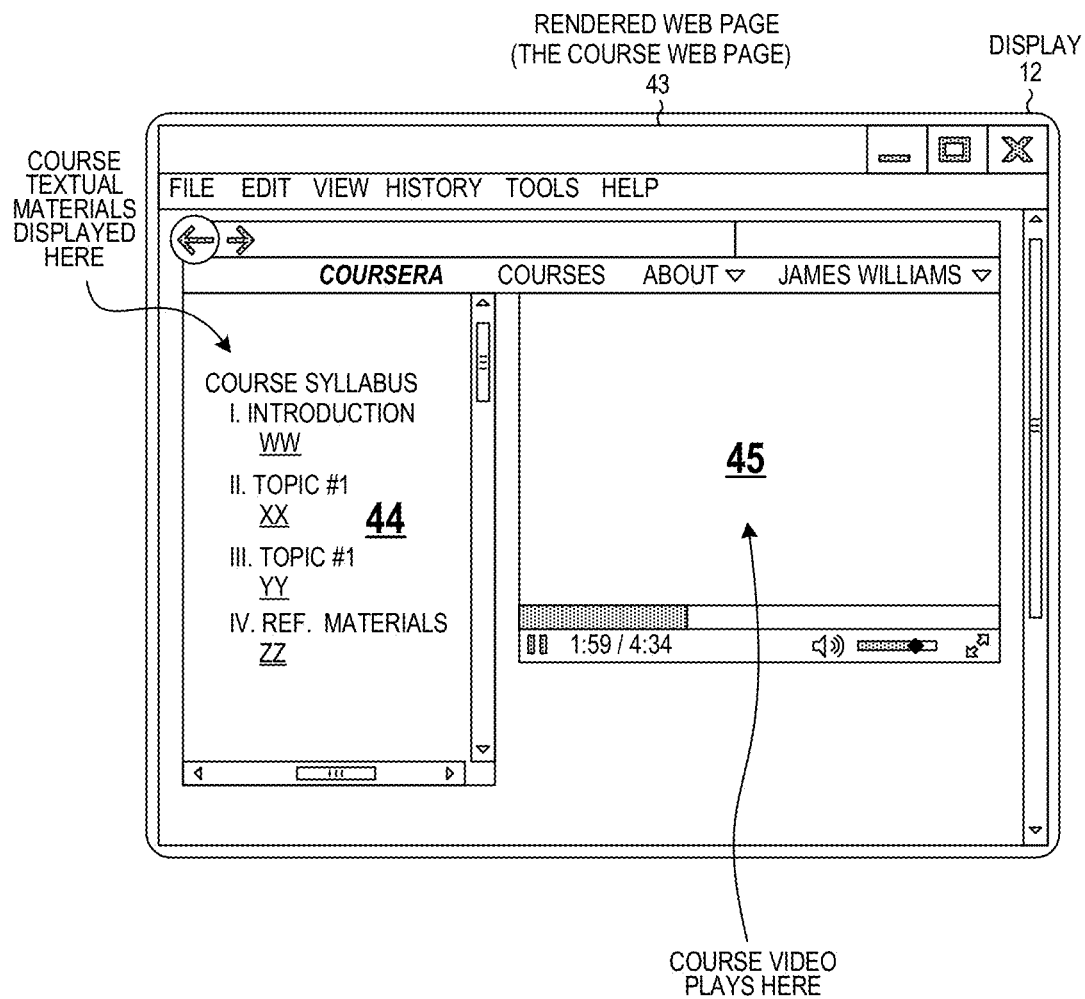
FIG. 4 is a diagram of web page usable by a student to view course textual materials and to view an instructional video for the course.

FIG. 4 is a diagram of a course web page 43. In the illustrated example, textual course materials 7 are displayed in window 44 and the instructional video 6 is played and viewed in window 45. Typically, the textual course materials 7 and the instructional video 6 are supplied directly from the database server 4 to the student's content viewing device 3 as indicated by arrows 84 and 46-48 in FIG. 1. In a page of the textual course materials are links. If the student selects a link, then another web page indicated by the link is displayed in the window 44. By clicking on links, and manipulating the scroll bars of the window 44, the student can view the textual course materials. The video in window 45 is provided by the video player 10. The student can use the standard screen video player icons to move forward and backward in the video, to start and stop the video, to change volume levels, and so forth.

Figure 5:
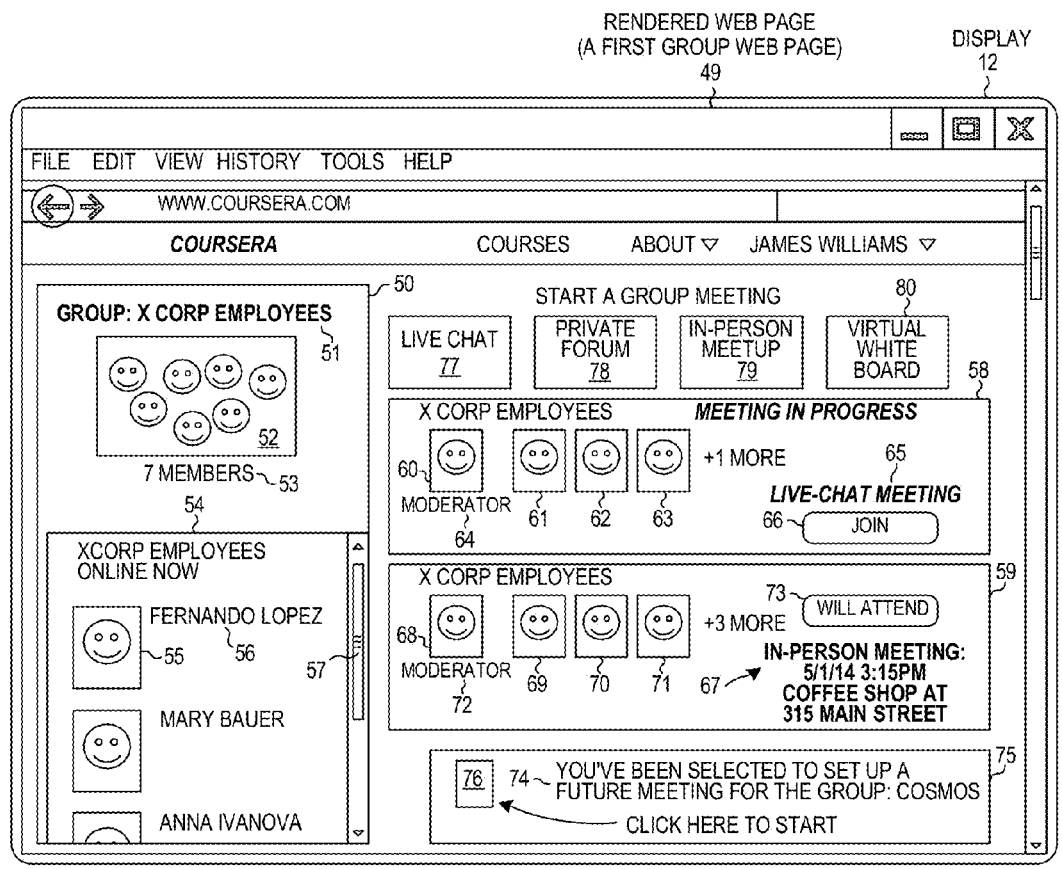
FIG. 5 is a diagram of a group web page (for the X CORP EMPLOYEES group) served by the OCCSWS of the system of FIG. 1.

FIG. 5 is a diagram of a group web page 49 in accordance with one novel aspect. When the student is viewing the dash board web page 29, the student may then click on the graphic icon of one of the groups indicated in the MY GROUPS section 38. This action will cause a group web page for the indicated group to be downloaded from the OCCSWS and to be rendered for the student's viewing. In the example of FIG. 5, the group web page 49 is the group web page for the X CORP EMPLOYEES group. General information about the indicated group is set forth in section 50 of the screen. This general information includes the name 51 of the group, a photo or graphic 52 that is indicative of the group, the number 53 of members of the group, and identifying information (a photo and name) of each member of the group. For example, the first member of the X CORP EMPLOYEES group as shown in FIG. 5 in named FERNANDO LOPEZ as indicated by the name 56, and a photo 55 of Mr. Lopez is shown. Such a photo and name is presented for each of the seven members of the group. The window 54 in which this group member information is presented has a scroll bar 57 for scrolling up and down through the member information presented. In addition, a section of the screen is dedicated for each type of meeting that has been scheduled for the group. In the example of FIG. 5, the X CORP EMPLOYEES group has live-chat meetings and in-person meetings. Information about the next scheduled live-chat meeting is presented in section 58 of the screen, and information about the next scheduled in-person meeting is presented in section 59 of the screen. In section 58, there is an indication of each group member in attendance at the ongoing live-chat meeting. The group members are indicated by photos 60-63 and their names. The names are not shown in FIG. 5 because there is not enough space on the diagram. In addition, the one group member who set up the meeting is the moderator. The identity of the moderator is also indicated by the MODERATOR label 64. The type of meeting is indicated by text 65. Because the meeting is in progress in the example illustrated, a JOIN icon or button 66 is presented. If the student James Williams clicks in the JOIN icon, then the student will be taken to a web page or screen where the student can take part in the live-chat meeting. In the present example, the live-chat feature provided is the publicly available Google HangOuts web feature provided by the third party provider Google. When the live-chat session is initially set up, the moderator receives a code from the third party provider that uniquely identifies the upcoming meeting. This code is then provided by the on-line course system so that when the student clicks on the JOIN icon 66, the code and any other necessary information are communicated to Google so that the student will be made to join the correct live-chat session.

In addition to live-chat sessions, groups may meet in in-person meetings. In the case of the X CORP EMPLOYEES group, the group page indicates that there is an upcoming in-person meeting scheduled. The text 67 indicates the location and time of the in-person meeting. As in the case of the live-chat meeting, the students who have indicated that they will attend are indicated by photos 68-71 and names. The student who set up the meeting is indicated by the text 72 as MODERATOR. The student can indicate to the other students in the group that he intends on attending the in-person meeting by clicking on the WILL ATTEND icon 73.

In addition to receiving information about meetings planned and set up by other people, the OCCSWS may through the group web page 49 prompt and ask student James Williams to set up a future meeting. The text prompt 74 is provided in section 75 of the screen along with a selectable icon or graphic 76. If the student clicks on the icon or graphic 76, then the OCCSWS will serve another web page to the student that directs the student step by step through a process of setting up a future group meeting. The student may, for example, be directed to a third party service (such as MeetUp.com) usable to set up in-person meetings, or the student may be directed to a third party service (such as Google HangOuts) usable to set up live-chat meetings.

Selectable icons or graphics 77-79 are also presented. If the student clicks on the LIVE CHAT icon 77, then the student is directed to the third part live-chat service. If the student clicks on the IN-PERSON MEETUP icon 79, then the student is directed to the third party service for setting up in-person meetings. If the student clicks on the PRIVATE FORUM icon 78, then the student is directed to a third party service for setting up an on-line private forum (for example, the Google+ forum service). In addition to icons 77-79, there is a VIRTUAL WHITEBOARD icon 80. If the student clicks on this icon 80, then an on-line whiteboard appears in part of the student's screen. The student is presented with selectable tools that the student can use to write on the on-line whiteboard, and to draw on the on-line whiteboard, and to erase items off the on-line whiteboard. All other students in the group, if they have selected the VIRTUAL WHITEBOARD icon 80, can similarly view the on-line whiteboard and can write on the whiteboard and erase from the whiteboard.

Figure 6:
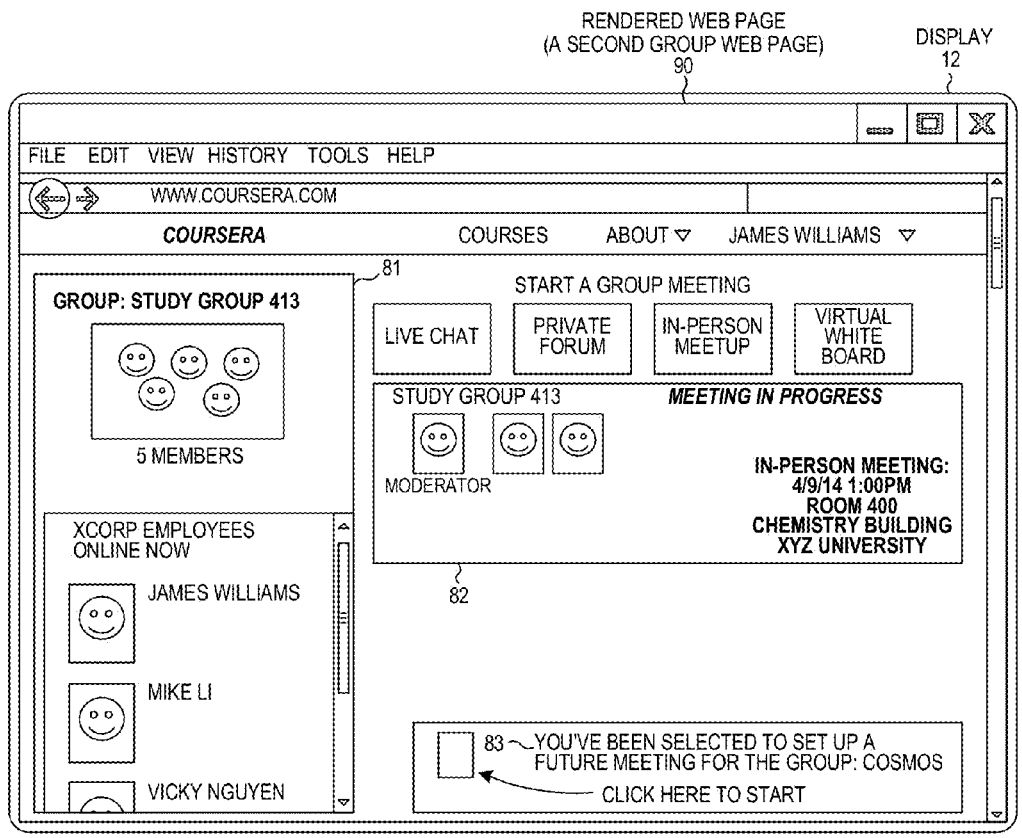
FIG. 6 is a diagram of a group web page (for the STUDY GROUP 413) served by the OCCSWS of the system of FIG. 1.

FIG. 6 is a diagram of the group web page 90 for the STUDY GROUP 413 group. This group web page 90 shows who the members of this group are in section 81 of the screen. The group web page 90 also indicates in section 82 that there is an in-person meeting of the STUDY GROUP 413, and that the in-person meeting is in progress, and the location of the meeting. In addition, the student (James Williams) is being prompted by text 83 to set up a meeting for another group, the COSMOS group, to which the student belongs.

Figure 7:
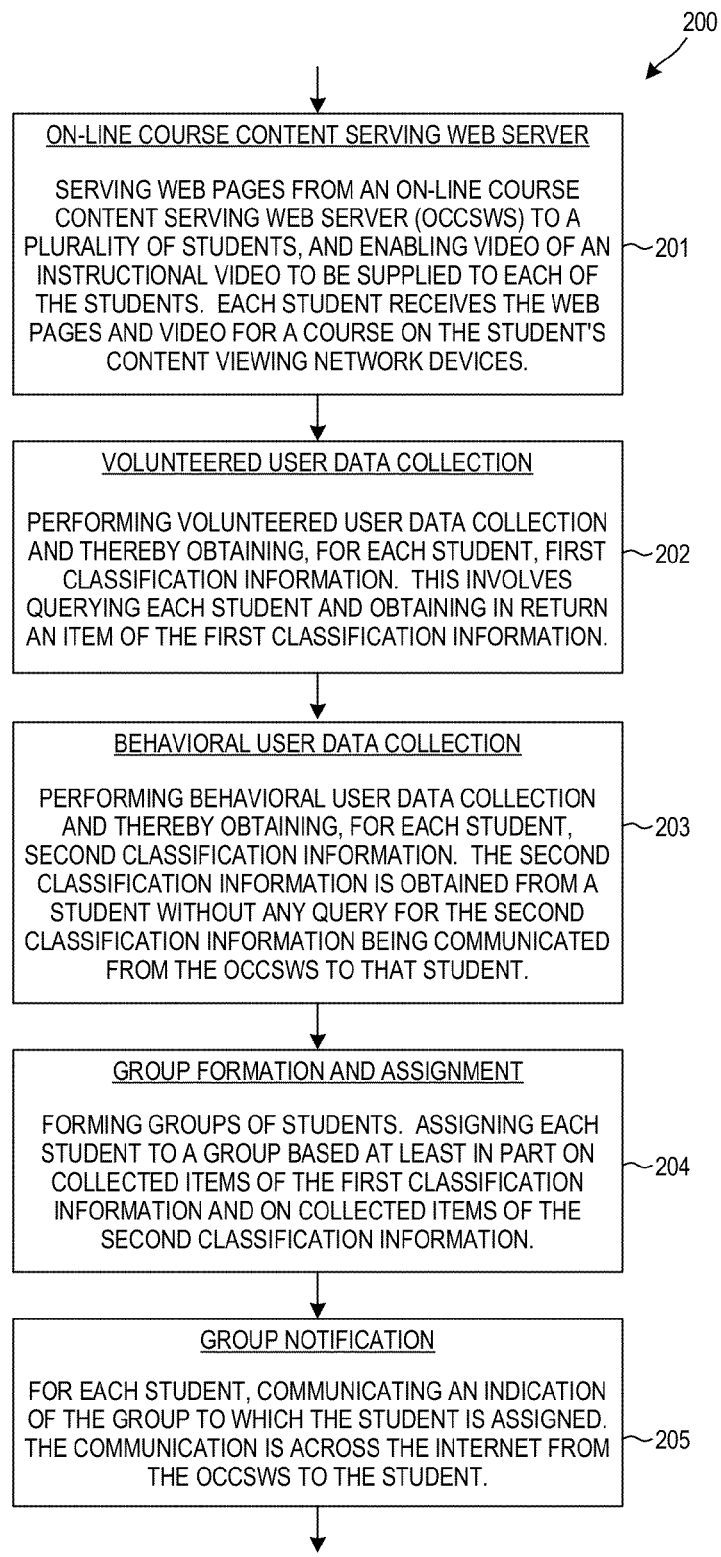
FIG. 7 is a flowchart of the method 200 in accordance with one novel aspect.

FIG. 7 is a flowchart of a method 200 in accordance with one novel aspect. An On-Line Course Content Serving Web Server (OCCSWS) serves (step 201) web pages for an on-line course to a plurality of students, and also enables the students access to an instructional video for a course. In one example, the OCCSWS is the OCCSWS 2 of FIG. 1, and the web pages include textual course materials, as well as the web pages of FIGS. 2-6. There are many hundreds of students enrolled in the same one on-line course, and the OCCSWS offers many on-line courses. Each of the students attending the on-line course being discussed here receives the web pages and the video on a personal content viewing network device of the student (such as, for example, the student's personal desk top computer, the student's personal lap top computer, the student's personal cellular telephone, or other computing device suitable for web browsing and viewing video that is communicated across the Internet).

Volunteered user data collection is performed (step 202) so that the OCCSWS obtains, for each student, an amount of first classification information. The term "volunteered" as it is used here means that the student provided the information knowingly in response to some kind of query from the OCCSWS. In one example, the first classification information includes numerous items of information received by the OCCSWS as a result of the student receiving the user profile web page 23 of FIG. 2, and being queried by the web page 23, and then in response entering the information asked for by the web page 23. The web page 23 queries the student for the indicated personal information, academic interests, skills, and personality characteristics. A student may, or may not, enter information in response to a query. This volunteered user data collection can be performed before, during, and/or after a student has already started taking part in the on-line course. Some of the first classification information (the volunteered information) may be obtaining when the student is initially setting up an account with the on-line course system, whereas other of the first classification information can be obtained at a later time in response to a query received in some other way on some other web page. The volunteered user data collection function is carried out by the volunteered user data collection module 15 of the server program 14 of FIG. 1. The items of first classification information are stored as fields of a record for the student, in a SQL database table, in database server 4. Conceptually, each row of the SQL database table is the record for a student, with the column entries of the row being the various items of first classification information.

In addition to volunteered user data collection, behavioral user data collection is performed (step 203) so that the OCCSWS obtains, for each student, an amount of second classification information. The term "behavioral" as it is used here means that the student does not knowingly enter the second classification in response to a query from the OCCSWS specifically requesting that information. For example, the IP address of the student may be obtained without the student knowingly entering that specific information in response to a query on an OCCSWS served web page. For example, the student's current geographical location may be determined or guessed at by collecting other information about how the user acted while on line. For example, the OCCSWS can obtain information about the student's study habits by monitoring when the student was on-line using on-line course materials, and/or by monitoring the intensity of activity of the student, and/or by monitoring the duration of use, and/or other student behaviors. The OCCSWS can monitor the degree to which the student voluntarily interacts with other students, and joins groups. The OCCSWS can detect the language used by the student by monitoring the language the student elects to use in viewing course materials or listening to videos. For example, the student's email address can be used to obtain certain information about the student. For example, the OCCSWS may embed analytics code into web pages that are served to the student, such that the student's web browser is then made to send reporting information about the student back to an analytics server. The OCCSWS may act as such an analytics server, or the analytics server may be another server that in turn communicates items of the second classification information back to the OCCSWS. The analytics code and techniques employed may be those employed in the art by Google Analytics and/or YouTube Analytics. For additional information on a suitable analytics technique usable to obtain second classification information, see: U.S. patent application Ser. No. 14/203,275, entitled "Eventing Analysis Framework," filed Mar. 10, 2014, by Brennan Saeta et al. (the subject matter of which is incorporated herein by reference). The behavioral user data collection function is carried out by the behavioral user data collection module 16 of the server program 14 of FIG. 1. The items of second classification information are stored as fields of the record for the student, in the SQL database table, in database server 4. Conceptually, the row of the SQL database table for a student contain some column entries for items of second classification information.

Based on the collected items of first classification information and on the collected items of second classification information, the OCCSWS assigns (step 204) each student to at least one group of students. In one example, a feature vector is formed for each user, where the feature vector is a set of many feature items. An individual feature item of the feature vector is a number or value that identifies a magnitude of a particular corresponding quality or characteristic of the student. Some feature items may have binary indicator (0/1) rather than longer numerical values. For example, a feature item may be "an ability to speak language X". If the student is determined to be able to speak the particular language then the feature item for that language will be made to have a digital "1" value, whereas if the student is determined not to be able to speak the particular language then the feature item for that language will be made to have a digital "0" value. The feature vector for each student has the same feature items and number of feature items. If a particular type of data is not collected on a particular student, then the corresponding feature item location in the feature vector for the student may be indicated to be unfilled. A feature vector of a student can be used to compare the student to another student's feature vector using a distance measure such as the Euclidean distance between two vectors. In determining the distance between vectors, certain feature items may be more heavily weighted than others. The distance between the feature vectors of two students is interpreted to be the affinity of the two students to work together. After determining a feature vector for each student, a clustering algorithm is used to group the vectors into groups. In one example, the clustering is performed so that each group contains about ten students. A common clustering algorithm that may be employed to carry out this grouping operation is the k-means algorithm. The k-means algorithm starts by guessing the centers of each initially chosen starting cluster, where the number of initial starting clusters is the number of students divided by the desired number of student in each group. The algorithm then groups the vector to the nearest cluster the vector belongs to, and then re-estimates the centers of each cluster again. These steps are repeated until a convergence onto a stable set of clusters is obtained. These clusters correspond to the groups of students in the on-line course. It is also possible to use other techniques such as Gaussian mixture models or hierarchical Bayesian models to form groupings where the students belong to potentially more than one group. The functions of forming groups and assigning students to those groups are carried out by the group formation module 17 of the server program 14 of FIG. 1.

For each student, an indication of the determined group is communicated (step 205) to the student. In one example, the indication of the group to which the student is assigned is communicated from the OCCSWS to the student in the YOUR GROUPS section 37 of the dash board web page 29 of FIG. 3. If the student is assigned to a group, then an indication of the group appears in the MY GROUPS section of the dash board page. If the student is assigned a group but the student must then voluntarily and affirmatively act to join the group to become a member of the group, then the assigned group is indicated in the SUGGESTED GROUPS TO JOIN section. A student assigned into a group may then be prompted through the student's group web page to perform various tasks to help ensure that the students in fact begin to interact as a group. For example, a student may be prompted to upload a group photo of the group. Another student may be prompted to set up an initial meeting for the group. After prompting students in this way, the OCCSWS monitors actions of the students in the group, and if the prompted student does not perform the requested task, then the OCCSWS may automatically prompt the student again at a certain time and/or the OCCSWS may automatically prompt another student to perform the requested task. The function of communicating to each student the group or groups to which the student has been assigned is carried out by the dash board module 18 and the group web page module 19 of the server program 14 of FIG. 1.

The OCCSWS, by forming groups of students having symbiotic and compatible personal characteristics, and by prompting and promoting particular students to work in particular groups, promotes overall student learning despite the large number of widely separately students who are taking the on-line course and despite the fact that the instructor may not be able to provide as much student feedback as would otherwise be desirable. The students, through group interaction, provide each other feedback and answer each other's questions.

Although the present invention has been described in connection with certain specific embodiments for instructional purposes, the present invention is not limited thereto. Students who are taking a course provided by the OCCSWS can be grouped by the OCCSWS based on information obtained from behavioral user data collection, without the grouping being based on any information obtained by volunteered user data collection. Alternatively, students who are taking a course provided by the OCCSWS can be grouped by the OCCSWS based on information obtained from volunteered user data collection, without the grouping being based on any information obtained by behavioral user data collection. A student can be assigned to more than one group by the OCCSWS. Although in some embodiments the OCCSWS supplies (or enables the supplying of) both textual course materials as well as video course materials to a student, in other embodiments the OCCSWS supplies only one type of course materials. Accordingly, various modifications, adaptations, and combinations of various features of the described embodiments can be practiced without departing from the scope of the invention as set forth in the claims.

What is claimed is:

1. A method comprising:
   (a) serving web pages from an on-line course content serving web server to a plurality of students;
   (b) enabling video data of an instructional video to be supplied to each of the students of the plurality of students;
   (c) performing volunteered user data collection and thereby obtaining, for each of the plurality of students, first classification information, wherein the volunteered user data collection performed in (c) involves submitting a query to each of the students and obtaining in return an item of the first classification information onto the on-line course content serving web server;
   (d) performing behavioral user data collection and thereby obtaining, for each of the plurality of students, second classification information, wherein the second classification information is obtained in (d) from each student without any query for the second classification information being communicated from the on-line course content serving web server to said each student, wherein the behavioral user data collection includes: 1) the on-line course content course content serving web server embedding analytics code into the web pages, and 2) causing web browsers that render the web pages to send reporting information to an analytics server;
   (e) based at least in part on the first classification information and the second classification information assigning each student of the plurality of students to a group of students, wherein there are a plurality of groups of students;
   (f) for each student of the plurality of students, communicating an indication of the group to which the student was assigned in (e) from the on-line course content serving web server to student, wherein (a) through (f) are performed by the on-line course content serving web server;
   (g) prompting at least one student of the group, through a group web page served by the on-line course content serving web server, to communicate with remaining members of the group, through the group web page, and
   (h) monitoring network interactions of the group to confirm that the communication between the prompted student and the remaining members of the group has been completed.

2. The method of claim 1, wherein the web pages are served in (a) to the students by communicating the web pages from the on-line course content serving web server to content viewing devices used by the students, wherein the instructional video of (b) is supplied across a network to content viewing devices used by the students, and wherein the indication of the group is communicated in (f) to each of the students by communicating the indication to the content viewing device used by the student.

3. The method of claim 1, wherein the video data in (b) is supplied from a server other than the on-line course content serving web server to the students without passing through the on-line course content serving web server, and wherein the enabling of (b) involves the on-line course content serving web server authorizing the student access to the video data.

4. The method of claim 1, wherein the video data in (b) is supplied from the on-line course content serving web server to the student, and wherein the enabling of (b) involves the on-line course content serving web server authorizing the student access to the video data.

5. The method of claim 1, wherein the behavioral user data collection of (d) involves monitoring a student's use of on-line course materials.

6. The method of claim 1, wherein the behavioral user data collection of (d) involves detecting a geographical location of a student without learning of the geographical location through the student's answer to a query about the student's geographical location.

7. The method of claim 1, wherein the behavioral user data collection of (d) involves detecting a behavior of a student without learning of the behavior through the student's answer to a query about the behavior.

8. The method of claim 1, further comprising:
   (i) supplying a web page to a student, wherein the student is assigned to a group in (e), and wherein the web page identifies all students that have been assigned to the group in (e).

9. The method of claim 8, wherein the web page supplied in (i) further includes a reference to a scheduled future on-line live video chat.

10. The method of claim 8, wherein the web page supplied in (i) further includes a reference to a scheduled future in-person meeting.

11. The method of claim 8, wherein the web page supplied in (i) further includes a reference to a private forum.

12. The method of claim 8, wherein the web page supplied in (i) further includes a prompt to set up an on-line live video chat.

13. The method of claim 8, wherein the web page supplied in (i) further includes a prompt to set up an in-person meeting.

14. The method of claim 1, wherein the assigning of (e) involves: 1) for each student converting the first classification information for the student and the second classification information for the student into a feature vector for the student thereby generating a set of feature vectors; and 2) using a clustering algorithm to analyze the set of feature vectors.

15. The method of claim 14, wherein a feature vector includes a geography feature element and an age feature element.

16. The method of claim 15, wherein the feature vector further includes a language feature element.

17. A method comprising:
   (a) supplying web pages from an on-line course content serving web server to a plurality of students, the web pages including embedded analytics code;
   (b) enabling a course video to be supplied to at least some of the plurality of students;
   (c) querying each of the students and obtaining in return first information about each of the students;
   (d) obtaining, for each of the plurality of students, second information about each of the students, wherein the second information is obtained in (d) from each student without any query for the second information being communicated from the on-line course content serving web server to said each student, wherein the obtaining includes causing web browsers that render the web pages to send reporting information to an analytics server;

(e) using the first information and the second information to group the students into a plurality of groups such that each student is assigned to at least one group;

(f) for each student of the plurality of students, communicating an indication of the group to which the student was assigned in (e) from the on-line course content serving web server to the student, and wherein (a) through (f) are performed by the on-line course content serving web server; and (g) prompting at least one student of the group, through a group web page served by the on-line course content serving web server, to communicate with remaining members of the group, through the group web page, and (h) monitoring network interactions of the group to confirm that the communication between the prompted student and the remaining members of the group has been completed.

18. The method of claim 17, wherein the course video in (b) is supplied from a server other than the on-line course content serving web server to the students without passing through the on-line course content serving web server, and wherein the enabling of (b) involves the on-line course content serving web server authorizing the student access to the course video.

19. The method of claim 17, wherein the course video is supplied from the on-line course content serving web server to the student, and wherein the enabling of (b) involves the on-line course content serving web server authorizing the student access to the course video.

20. The method of claim 17, further comprising:
  (i) for each student of the plurality of students, supplying a web page to the student, wherein the web page supplied in (g) identifies all students that have been assigned in (e) to the group.

21. The method of claim 17, further comprising:
  (i) for each student of the plurality of students, supplying a web page to the student, wherein the web page supplied in (g) includes a reference to at least one of the group consisting of: an on-line live video chat, an in-person meeting, and a private forum.

\* \* \* \* \*